United States Patent [19]
Zurstrassen

[11] Patent Number: 6,029,148
[45] Date of Patent: Feb. 22, 2000

[54] DATA PROCESSING SYSTEM FOR THE SELECTIVE DISTRIBUTION OF ASSETS BETWEEN DIFFERENT PORTFOLIOS

[75] Inventor: Patrick Zurstrassen, Joseph Hanssen, Luxembourg

[73] Assignee: Fastnet Resources, Luxembourg, Luxembourg

[21] Appl. No.: 08/875,939

[22] PCT Filed: Dec. 8, 1995

[86] PCT No.: PCT/EP95/04823

§ 371 Date: Aug. 8, 1997

§ 102(e) Date: Aug. 8, 1997

[87] PCT Pub. No.: WO97/22071

PCT Pub. Date: Jun. 19, 1997

[51] Int. Cl.[7] .................................................. G06F 17/60
[52] U.S. Cl. .................... 705/36; 705/37; 705/35
[58] Field of Search ........................ 705/36, 35, 37, 705/38

[56] References Cited

U.S. PATENT DOCUMENTS

| | | | |
|---|---|---|---|
| 5,148,365 | 9/1992 | Dembo | 705/36 |
| 5,193,056 | 3/1993 | Boes | 705/36 |
| 5,799,287 | 8/1998 | Dembo | 705/36 |
| 5,812,987 | 9/1998 | Luskin et al. | 705/36 |
| 5,819,238 | 10/1998 | Fernholz | 705/36 |
| 5,884,285 | 3/1999 | Atkins | 705/36 |
| 5,911,135 | 6/1999 | Atkins | 705/36 |
| 5,911,136 | 6/1999 | Atkins | 705/36 |

FOREIGN PATENT DOCUMENTS

| | | | |
|---|---|---|---|
| 401203 | 5/1990 | European Pat. Off. | G06F 15/24 |
| 686926 | 5/1995 | European Pat. Off. | |

*Primary Examiner*—Allen R. MacDonald
*Assistant Examiner*—Susanna Meinecke-Diaz
*Attorney, Agent, or Firm*—Sughrue, Mion, Zinn, Macpeak & Seas, PLLC

[57] ABSTRACT

In a method for distributing securities of portfolio items among a plurality of internal portfolios, each portfolio item has a determined number of securities distributed over each internal portfolio according to a determined consolidation ratio ($CRC_{i,j-1}$) attributed to each internal portfolio. A total value ($PV_{j-1}$) of the portfolio items is determined and a transaction assigned to one portfolio item within one internal portfolio is received, having a transaction value ($NCA_i$). A further consolidation ratio ($CRC_{i,j}$) is determined for each internal portfolio based on the consolidation ratio ($CRC_{i,j-1}$), total cash assets ($PV_{j-i}$), and the transaction value ($NCA_i$). In a further step, a transfer of a determined number of securities is performed, for each portfolio item, from each internal portfolio to the one internal portfolio to which the transaction is assigned. Finally, the transaction is allotted to each of said internal portfolios according to the further consolidation ratio ($CRC_{i,j}$). The result is that the portfolios are cloned portfolios, i.e. internal portfolios being equivalent on a relative basis.

5 Claims, 8 Drawing Sheets

DATA PROCESSING SYSTEM FOR THE SELECTIVE DISTRIBUTION OF ASSETS BETWEEN DIFFERENT PORTFOLIOS

FIELD OF THE INVENTION

This invention relates to a system intended to perform the selective distribution and transfer of assets between different internal portfolios belonging to one or more entities which may or may not be legal persons and which are able to hold, own or collect assets which may themselves be subjected to individual management and/or administration. The object of the invention is, in particular, to provide a data processing system and process capable of performing, in a global and interactive fashion, the selective distribution of information items representing the assets in question.

The invention is intended to be used, for example, for the centralized management of collective investment structures, such as an investment fund, a section or a class of shares/units belonging to a collective investment structure, an ordinary bank account held by a private individual, a pension fund, spare parts or equipment held in stock within industrial or commercial undertakings having a number of branches or subsidiaries.

The problem to which the proposed invention and data processing system relates is explained and described below by means of an example of the way in which they can be applied to the management of collective investment structures.

STATE OF THE ART

All companies and investment promoters are anxious to centralize the administration and management of their collective investment structures (CIS), for reasons of efficiency and cost. The globalization of markets, which has been encouraged by international conventions and treaties, is actually causing promoters to search for the ideal product which is able to accommodate all markets and countries. In practice, the promoter in the field is unfortunately frequently compelled to adapt what should be a single product to different markets or consumers or sales networks. The object is first and foremost to meet a marketing objective. There is a need to meet the expectations and requirements of consumers as closely as possible and also to prevent detrimental effects with regard to tax. To summarize, the problem is that investment promoters have to set up a number of different entities, vehicles and structures.

This means that investment promoters are facing a dilemma. On the one hand, the considerations of efficiency and cost described above encourage then to adopt a single structure, that is to say they are influenced by what might be termed centripetal market forces, i.e. forces which have an essentially centralizing effect. On the other hand, the market is subject to centrifugal forces which are actually decentralizing, are mainly the result of commercial objectives and move in the opposite direction to the centripetal forces. It is centrifugal forces which encourage promoters to create a multiplicity of structures.

In order to resolve this dilemma and reconcile these opposing forces, promoters need to be permitted to globalize the administration and management of all the entities which centrifugal forces compel them to create.

Known globalization methods are based on legal pooling of their assets of one form or another so that they can be subjected to global management and administration. Such pooling is always made possible by the creation of a joint portfolio. An example of such an arrangement is described in U.S. Pat. No. 5,193,056.

DESCRIPTION OF THE INVENTION

This invention takes a different path and provides for a global data processing system for distributing assets between different portfolios belonging to one or more entities which may or may not be legal persons and which are able to hold, own or collect assets and which may themselves be the object of an individual management and/or administration measure. This data processing system is defined in the claims.

The data processing system according to the invention is based on a principle known as "cloning". This term has been chosen from the field of biology. Identical twins are the result of natural cloning. They have the same parents and the same appearance. But in reality, each twin has a unique personality and will choose his/her own path in life. The same applies to the cloning of internal portfolios belonging to one or more entities as defined above which, in the most successful configuration, makes it possible to create identical twin portfolios or entities.

In such a configuration, the cloned internal portfolios are not mutually linked by any kind of contract, but they do enter into contracts with the same parties. In particular, they have the same depositary and the same administrative agent, which is an essential condition for cloning. All internal portfolios which have been cloned are always completely independent from a legal viewpoint.

A Cloned Entity comprises at least two internal portfolios: a Cloned Portfolio (CP) and a Specific Portfolio (SP). The Cloned Portfolio combines globally managed and administered assets with assets from one or more other Cloned Portfolio(s) via the same Consolidated Manager. The Specific Portfolio of a Cloned Entity, by contrast, collects assets which are managed and administered individually and are not subject to any kind of consolidated management.

On the other hand, a Cloned Entity may comprise one or more Internal Cloned Portfolios. A Cloned Entity which only comprises one Cloned Portfolio is termed a Mono-portfolio whereas a Cloned Entity comprising more than one Cloned Portfolio is termed a Multi-portfolio. A Cloned Multi-Portfolio Entity is therefore a Clonable Entity with assets which have all been divided up into a number of different Internal Cloned Portfolios, each of which is managed and administered globally by an individual Asset Manager together with one or more Internal Cloned Portfolios belonging to other Cloned Entities.

A Manager may take the form of a person, an organization or an entity which is tasked with managing and/or administering either a Specific Portfolio (SP) of a particular Cloned Entity (in which case the term Specific Manager is used), or a set of Cloned Portfolios (CP) having a common identification number, which is reflected in an information structure which consolidates the positions of the said Cloned Portfolios (in which case the legal term Global Asset Manager is used).

Unlike known globalization methods, cloning therefore does not require any legal link between the Cloned Entities (independent and total control over assets) or the creation of any kind of common external portfolio (legal unity). This makes full and permanent separation of the assets possible. This permanent separation of the assets of participating Entities results in a relatively high degree of financial independence and full legal independence.

Such a configuration of Clonable Entities requires an information processing system which is designed to determine and control distribution of the assets of the various Internal Cloned Portfolios on a global basis.

This objective is achieved via this invention, which provides a data processing system and process as defined in the claims.

This system comprises information and data processing means which communicate and operate between the various Cloned Entities, the Asset Manager and the Depositary.

To summarize, the processing system according to the invention has three main functions:

1) It provides an information system based on data representing the assets of the various Cloned Portfolios. This global information processing system according to the invention gives a Global Asset Manager access to a huge information system, including a consolidated management report which enables the Manager to take global decisions.

2) It readjusts the Internal Cloned Portfolios after any specific transaction involving one or more cloned internal portfolios in such a way that they are always equivalent on a relative basis. The Internal Portfolios are readjusted via a processing procedure which is termed Liabilities Allotment System. This system processes cashflow from operations (subscriptions, redemptions, conversions) occurring at the level of each Cloned Entity. In principle, any one of such operations always causes one or more Cloned Entities to have a larger or smaller proportion of assets held in cash than the others. Such processing system readjusts the Internal Portfolios by generating purchases for Cloned Entities having a relative surplus of cash assets and sales for Cloned Entities having a relative deficit of cash assets. These technical transactions of purchases and sales are generated automatically by the information system. Such processing is carried out in three stages: proposal, validation and actual processing.

3) It allots to each Internal Portfolio or each Cloned Entity all the operations which have been globally initiated and effected by the Global Asset Manager on the basis of a consolidated management report of the entire assets of the various Cloned Entities. Such operations are globally implemented within the processing system (Asset Allotment System). The processing is carried out in three stages: proposal, validation and actual processing.

In particular, the data processing system according to the invention implements a data processing procedure which essentially comprises five stages:

(i) a preliminary Preparation data processing stage in which the data representing cash assets supplied to or taken from the Global Asset Manager is calculated, (ii) a data processing stage in which data representing the relative importance of an Internal Portfolio or a Cloned Entity within a Consolidation Statement is calculated, (iii) a global data processing procedure intended to readjust the Internal Cloned Portfolios of Cloned Entities, (iv) a procedure by which a set of information and information processing structures are created to permit the processing of data representing operations carried out globally, (v) a data processing stage in which the data representing operations carried out globally is alloted to each Internal Portfolio or each Cloned Entity.

First and foremost, the invention makes it possible to achieve globalization of the management and/or administration of two or more Cloned Entities. However, apart from achieving the globalization of the management and administration of one or more Cloned Entities, the invention also makes the multi-manager management and/or administration of a single Clonable Entity possible.

Under such an arrangement, a number of managers are each permitted to manage an Internal Portfolio containing a proportion of the assets of the Entity in question. Although the invention does permit such an option, there is no pooling of assets in the case under consideration here, but there is more than one asset manager.

The invention is described in greater detail below, using as example a mode of implementation which is in no way limitative and is illustrated by the attached drawings. In the interests of clarity, the proposed invention and data processing system are explained and described below using their application to the management of a mono-portfolio collective investment structure (CIS) as an example. All the following developments naturally apply mutatis mutandis to multi-portfolio global management and/or administration and to multi-manager management and/or administration.

DESCRIPTION OF AN EXEMPLARY EMBODIMENT

The data processing system according to the invention is intended to control the management and/or the administration of a number of different Entities or Internal Portfolios combined in a configuration which is organized according to the Cloning principle. A configuration of Entities of this type is shown in diagrammatic form in FIG. 1. The various Entities 1, four of which are represented, have full and independent control over their assets. They are not mutually linked by any kind of contract, but they each conclude identical or similar contracts with the same Asset Manager (s) 2, the same Depositary(ies) (3) and other administrative agents or auditors (not shown). Each of the Entities 1 is free to conclude separate distribution contracts which are designed to accommodate their particular target markets. Such a configuration does not make it necessary to create any kind of common external portfolio, which distinguishes it from known configurations.

Figure 1:
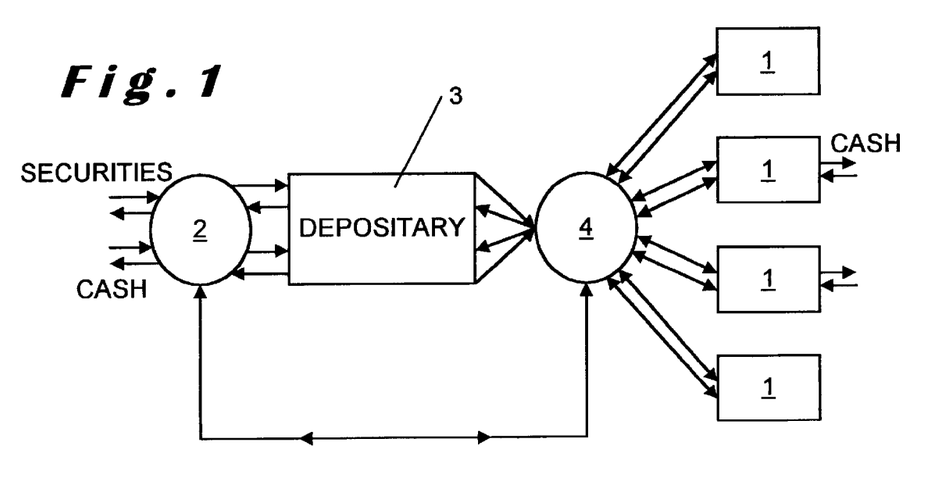
FIG. 1 is a diagram of a configuration of financial structures in which the invention is used.

Global information processing in such a configuration is combined in a data processing system according to the invention, represented by block 4, which effectively and flexibly performs the global monitoring of management and/or administration of the various Internal Portfolios of the Cloned Entities 1.

In a configuration of the type described above, as in the case of a normal fund, the structures of the accounts of each of the Entities 1, which are termed Cloned Entities, are mainly influenced by two types of action: actions taken and monitored by the Manager 2 (investments and disinvestments) mainly on the assets side, on the one hand, and actions taken by investors (subscriptions, redemptions, switches or conversions) or benefiting investors (distribution of dividends) on the liabilities side, on the other hand. The characteristic feature of cloning is that it aims to ensure that the accounts of the various Cloned Entitites have essentially the same structure. Any of the actions listed above must therefore influence all the Cloned Entities. This is achieved by the data processing system according to the invention. Such a system includes means for communicating and operating between the various Cloned Entities 1, the Manager(s) 2 and the Depositary 3.

Figure 2:
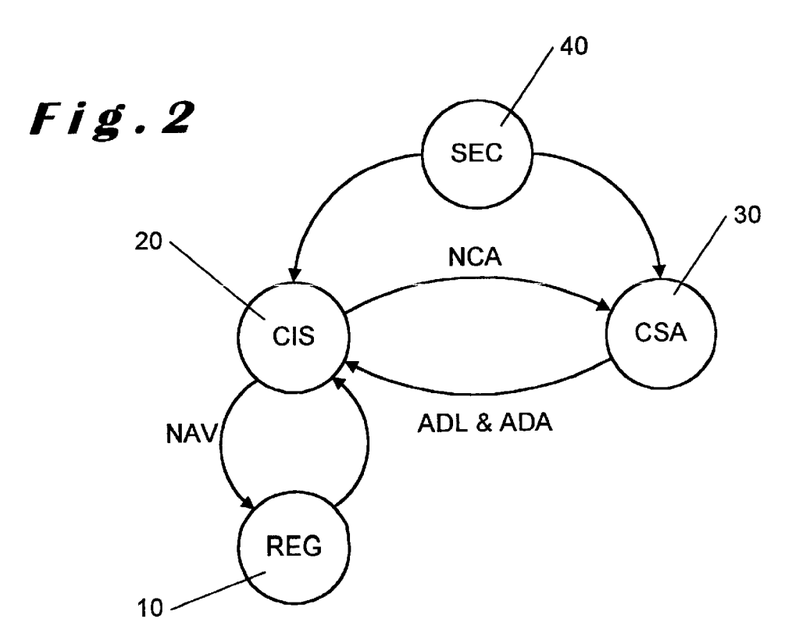
FIG. 2 is a block diagram of the data processing system according to the invention.

FIG. 2 is a diagram of the data processing system according to the invention, which comprises a Register module 10 (REG), an Entities module 20 (CIS), a Consolidation Statement module 30 (CSA) and a Securities module 40 (SEC).

The Register module 10 (REG) manages the register of shareholders or partners for each Cloned Entity. The Entities module 20 (CIS) combines means for processing data relating to the accounting and administrative management of the various Cloned Entities. The Consolidation Statement module 30 (CSA) combines the information structures and the information processing means which are necessary for global management of the Cloned Portfolio positions and also includes means for implementing and monitoring processing procedures according to the invention. The Securities module 40 (SEC) contains all the means required to permit the management of investment operations.

The data processing procedure according to the invention essentially relates to functional operations and interactions between modules 10, 20, 30 and 40. Processing makes it possible to keep constantly up to date a Consolidation Statement relating to the Cloned Entities and the relative proportion of each one of the latter within the Consolidation Statement.

Briefly stated, the data processing procedure essentially comprises five stages:

(i) a preliminary data processing stage (Preparation) applied to module 20 on the basis of the information sent by module 10 and which calculates data representing the cash assets supplied to or withdrawn from the Global Asset Manager, (ii) a data processing stage (Calculation of the Consolidation Ratio) initiated from module 30 in response to information from module 20 and which calculates the relative proportion of a Cloned Entity within a Consolidation Statement, (iii) a procedure for readjusting the Cloned Portfolios of Cloned Entities (Liabilities Allotment) initiated by module 30, (iv) a data processing stage initiated by module 30 which makes it possible to allot the operations carried out on a global basis to each Cloned Entity (Asset Allotment).

(v) a procedure for creating a set of information structures (Consolidation Statement) and an information processing procedure to process data representing all the operations carried out on a global basis.

The data representing the assets of the Internal Portfolios of Cloned Entities are stored in a database and the operations station of the Manager of the consolidated set (station 2 (AM) in FIG. 1) communicates with module 30 (CSA) which edits and updates a consolidated management report (CMR) for the Global Asset Manager to be used as a basis for investment decisions by the latter.

Figure 3:
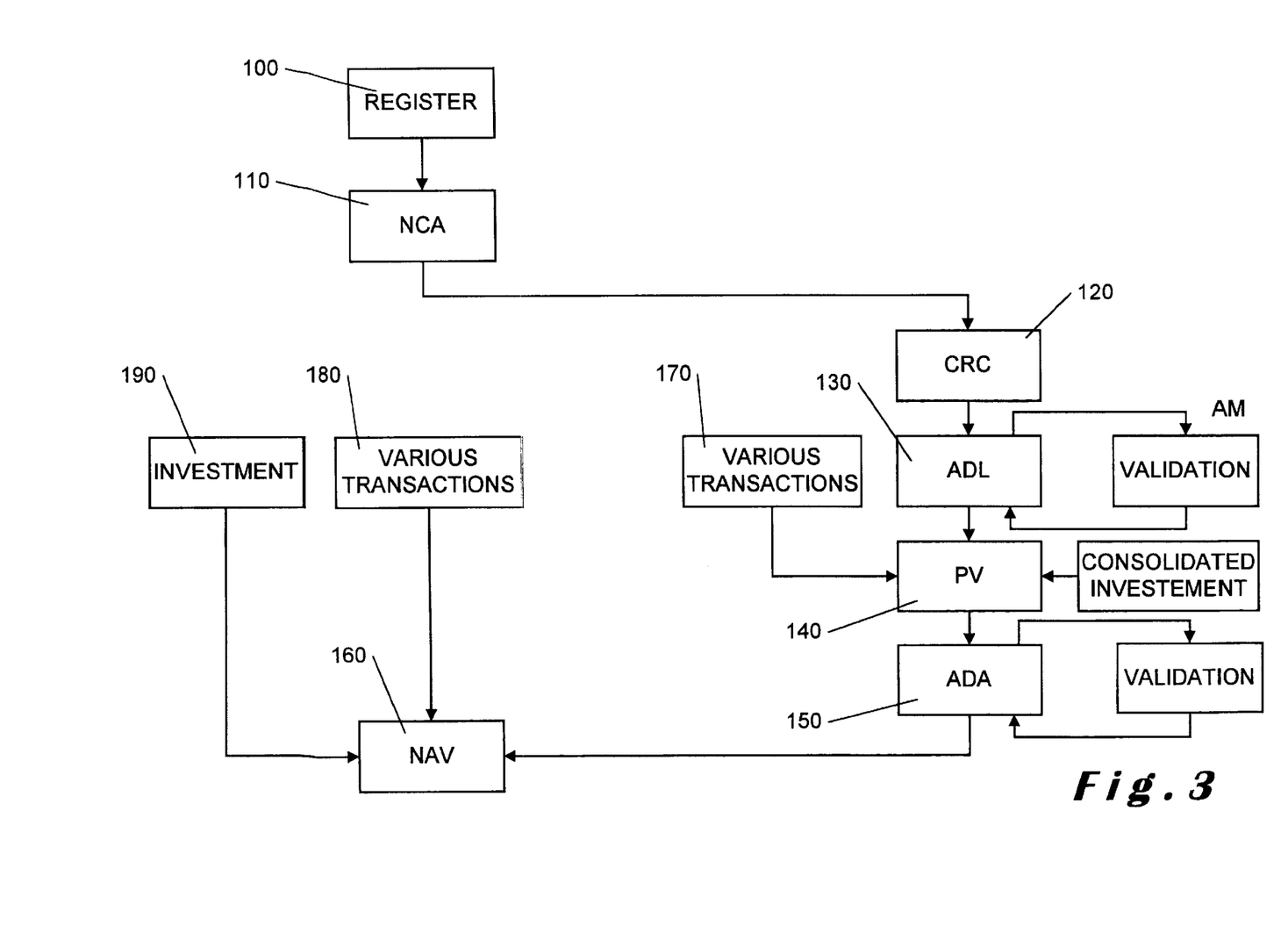
FIG. 3 is a functional diagram illustrating the way in which data is processed according to the invention in the case of global management of a Mono-portfolio Cloned Entity.
Figure 4:
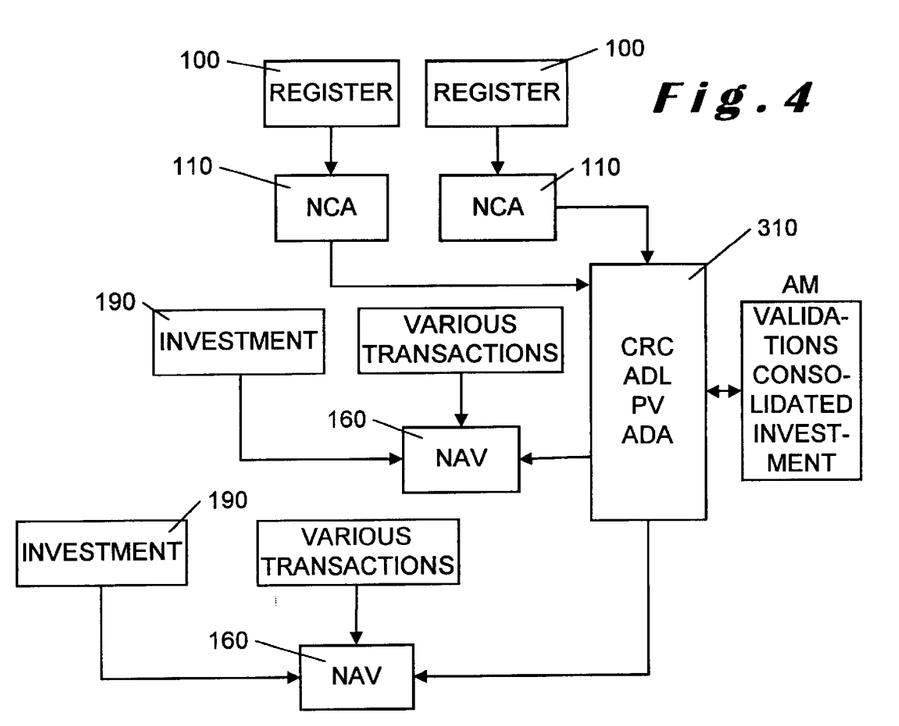
FIGS. 4 and 5 are block diagrams illustrating the way in which data is processed according to the invention in two other specific cases of application taken as examples.
Figure 5:
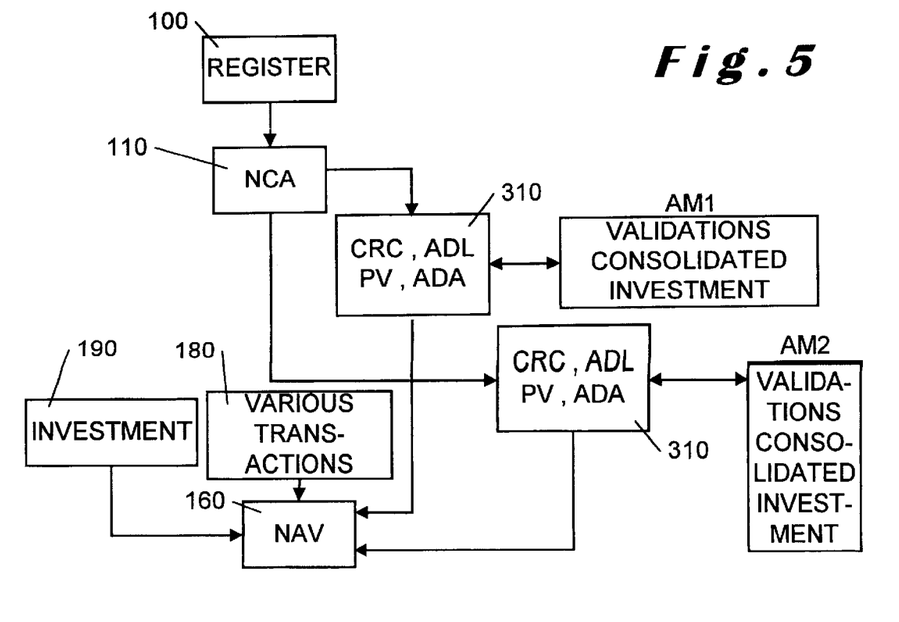

FIGS. 3, 4 and 5 illustrate the course of processing throughout the day involving a single Cloned Entity and a single Consolidation Statement, two Cloned Entities and a single Consolidation Statement and a single Cloned Entity and two Consolidation Statements respectively.

In these figures, register 100 is the register which is specifically associated with the Cloned Entity being considered. This register records data representing the operations (subscriptions/redemptions) of relevance to the Cloned Entity. The register is implemented normally and subscription and redemption operations are generated at an interface (not shown) between the REG module 10 and the CIS module 20 (FIG. 2).

Referring to FIG. 3, the day's processing includes a Preparation procedure (NCA) performed at block 110 for the Cloned Entity in question, a Consolidation Ratio calculation procedure (CRC) performed globally at block 120 for the consolidated set, a Liabilities Allotment procedure (ADL) performed globally at block 130, a Preparatory Valuation (PV) procedure performed globally at block 140, an Asset Allotment procedure (ADA) performed globally at block 150 and a Net Asset Value calculation procedure (NAV) performed at block 160 for the Cloned Entity. The procedures represented by blocks 130 and 150 are actually initiated under the control of the Global Asset Manager (AM) of the consolidated set thanks to a separate validation facility.

Blocks 170 and 180 represent various transactions which may be taken into account and blocks 190 and 200 represent investment operations which may be initiated by the Specific Manager of the Entity in question and by the Manager of the consolidated set respectively.

FIG. 4 shows an example of application to two Cloned Entities belonging to the same Consolidation Statement. It will be observed that there is an individual Preparation (NCA) for each Cloned Entity and that the data processing is performed globally for the consolidated set. FIG. 5 shows an example of application to a Cloned Entity associated with two Consolidation Statements. The processing according to the invention is performed after the Preparation (NCA) procedure has been completed and is performed at the same time for both of the Consolidation Statements, with separate validation for each of the Consolidated Managers.

The particular procedures occurring as parts of the data processing are shown in FIGS. 6 to 12, FIG. 6 showing changes in the status of the Consolidation Statement module 30 (CSA) in the course of processing.

Preparation NCA processing (FIG. 7) makes it possible to manage Partial clones (Cloned Entities, a proportion of the assets of which is subjected to specific management and administration, i.e. at the actual level of the Cloned Entity in what is termed a Specific Portfolio) and Multi-portfolio clones (Cloned Entities, the assets of which are divided between at least two Cloned Portfolios).

Figure 7:
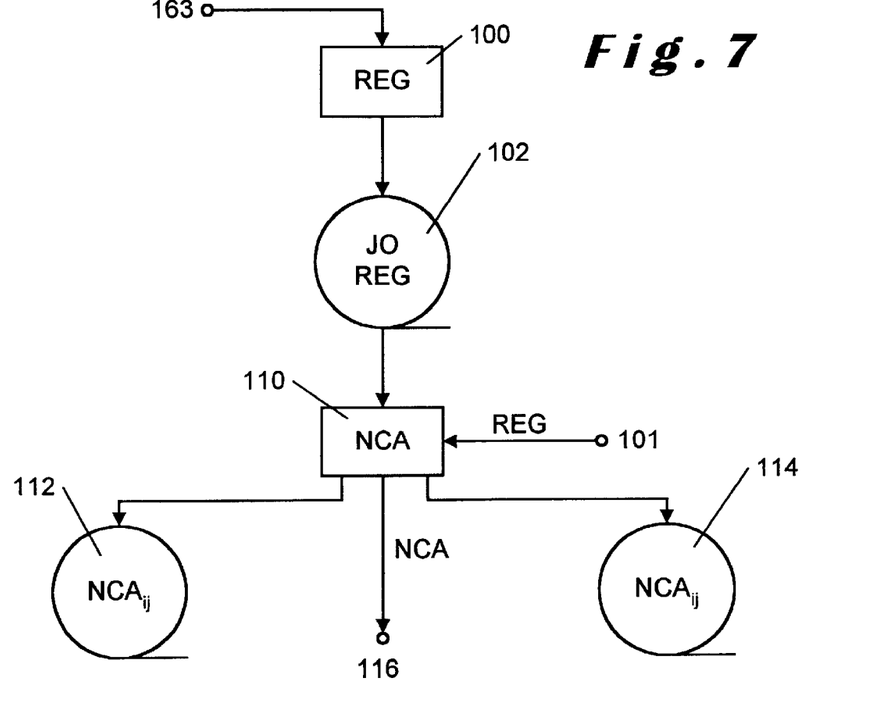
FIG. 7 is a flow chart illustrating the preliminary Preparation data processing procedure according to the invention.

This processing (block 110) is initiated at 101 and is applied to each of the Cloned Entities when all the registration operations have been entered. The data which has been entered is retrieved and monitored so that the accounting log of the Cloned Entity (block 102) can be updated. The procedure calculates data representing the Preparation percentage (% of NCA) which represents the relationship between the balance, which may be positive or negative, of cash assets (resulting from subscriptions, redemptions and distribution of dividends) of each Cloned Entity and the balance, which may be positive or negative, of cash assets supplied to or withdrawn from the Global Asset Manager AM in question.

The Manager SM of a Cloned Entity may increase or reduce the automatically calculated amount made available. This makes it possible, for example, to transfer cash assets from one Internal Portfolio (for example a specific portfolio) to another Internal Portfolio (for example a Cloned Portfolio) or between two Cloned Portfolios.

Each processing generates Preparation operations ($NCA_{ij}$) within a database (block 112). Such a processing may be reinitiated as long as the following processing stage (Creation of the Consolidation Ratio) has not been performed.

Creation of Preparation at a given date is only authorized if the Cloned Entity was valued (and the valuation was confirmed) on the most recent Net Asset Value date. It is possible to add (Cloning) or delete (Decloning) Cloned Portfolios. The deletion of a Cloned Portfolio corresponding to the removal of a Cloned Entity from consolidated management (partial or total Decloning) is only possible if the new Consolidation Ratio has not yet been calculated and the previous Consolidation Ratio is zero.

The following processing stage (FIG. 8) calculates data representing the Consolidation Ratio (CRC). This stage updates the Consolidation Ratios of each Cloned Entity and produces data $CRC_{ij}$ representing the relative proportion of the Cloned Entity i in a given Consolidation Statement at time j (block 120). This procedure is initiated in response to a signal NCA at point 116 indicating that the Preparation has been performed. All the subsequent allotment processings are based on this $CRC_{ij}$ Ratio.

Figure 8:
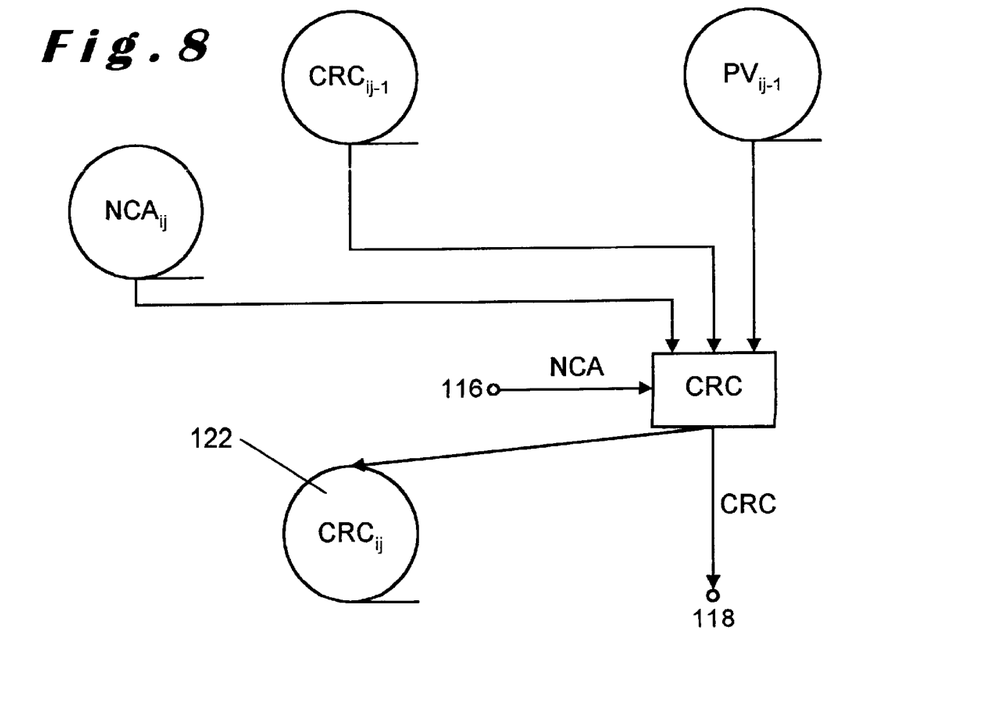
FIG. 8 is a flow chart illustrating the data processing procedure designed to establish the Consolidation Ratio according to the invention.

The Cloned Entities included in the calculation of the $CRC_{ij}$ have all been subjected to Preparation in respect of the Consolidation Statement being processed. The Cloned Entities included in the calculation of the preceding $CRC_{ij}$ (i.e. on the date of the most recent NAV, asset value, and at time j-1) and which have been given a CRC which is not zero must undergo Preparation processing.

The new Consolidation Ratio of a Cloned Entity is calculated in accordance with the following principle:

$$CRC_{ij} = \frac{PV_{j-1} * CRC_{ij-1} + NCA_i}{PV_{j-1} + \sum NCA_i}$$

where $PV_{j-1}$ is the preceding preparatory valuation of the Consolidation Statement, $CRC_{ij-1}$ is the preceding CRC of the Entity i in the Consolidation Statement j-1, $NCA_i$ is the amount supplied by the Entity i to the Consolidated Manager (AM).

The amount $PV_{j-1}*CRC_{ij-1}$ represents the amount included in respect of the Entity i in the Consolidation Statement on the preceding preparatory valuation date of the Statement in question.

By way of example, let us consider two Cloned Entities each having a Consolidation Ratio $CRC_{ij-i}$ of 50% within a Consolidation Statement having a cash asset balance of 200 $. To effect a transfer of cash assets amounting to 20 $ from Entity 2 to Entity 1, the processing system calculates the new $CRC_{ij}$ as follows:

$$\text{Entity 1: } CRC_{ij1} = \frac{(200 \times 0.50) + 20}{200 + 20 - 20} = \frac{120}{200} = 60\%$$

$$\text{Entity 2: } CRC_{ij2} = \frac{(200 \times 0.50) + 20}{200 + 20 - 20} = \frac{80}{200} = 40\%$$

Figure 6:
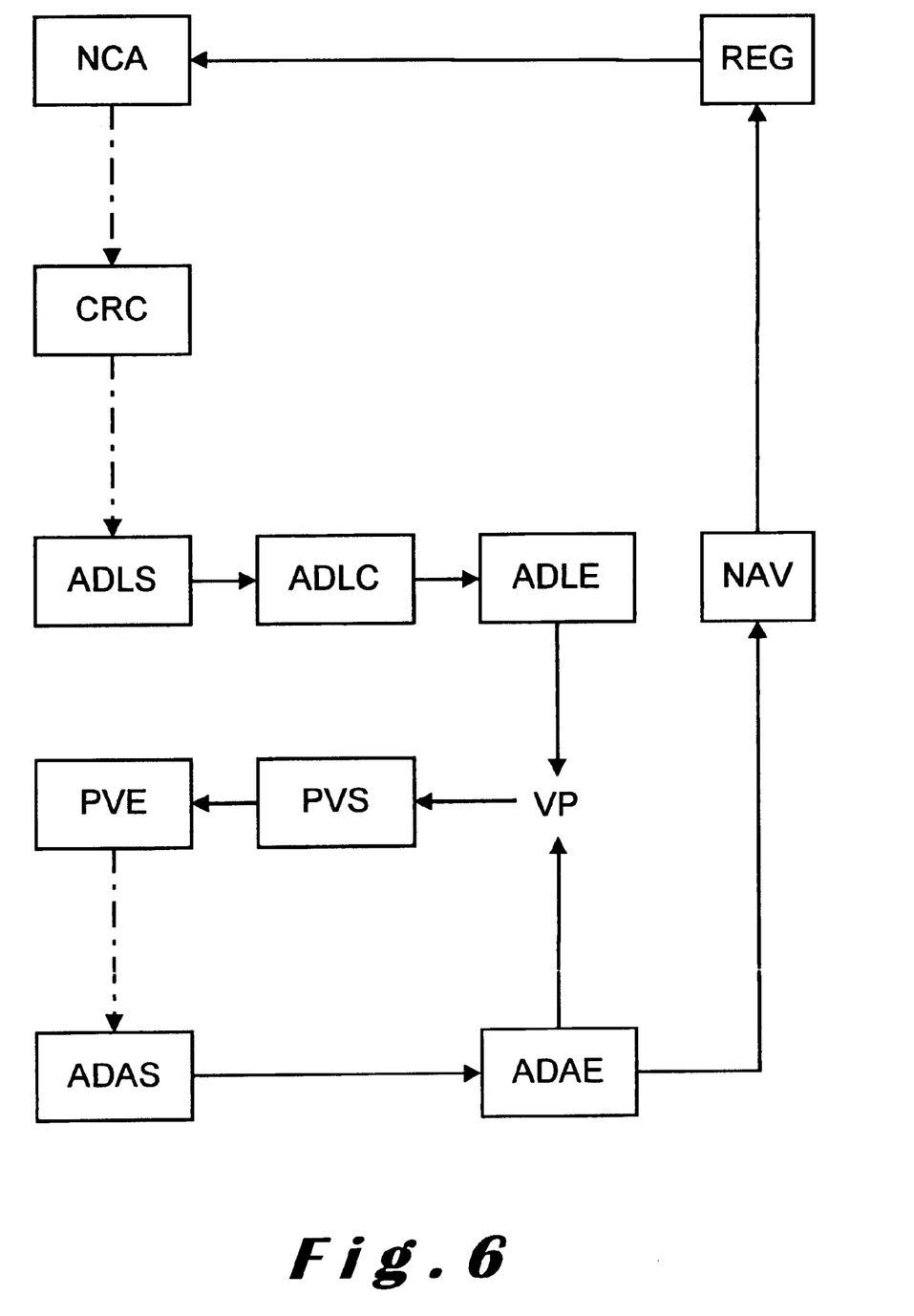
FIG. 6 is a flow chart showing the changes of status of the Consolidation Statement module.

The CRC processing updates the Consolidation Ratios of the Cloned Entities and maintains the histories of the Ratios. Updating the CRC positions the status of the Consolidation Statement at "CRC" (FIG. 6). The validation of Consolidation Ratios at point 118 automatically initiates the following procedure (Allotment due to Liabilities). The latter procedure may only be effected if the Consolidation Statement status is CRC (FIG. 6).

Figure 9:
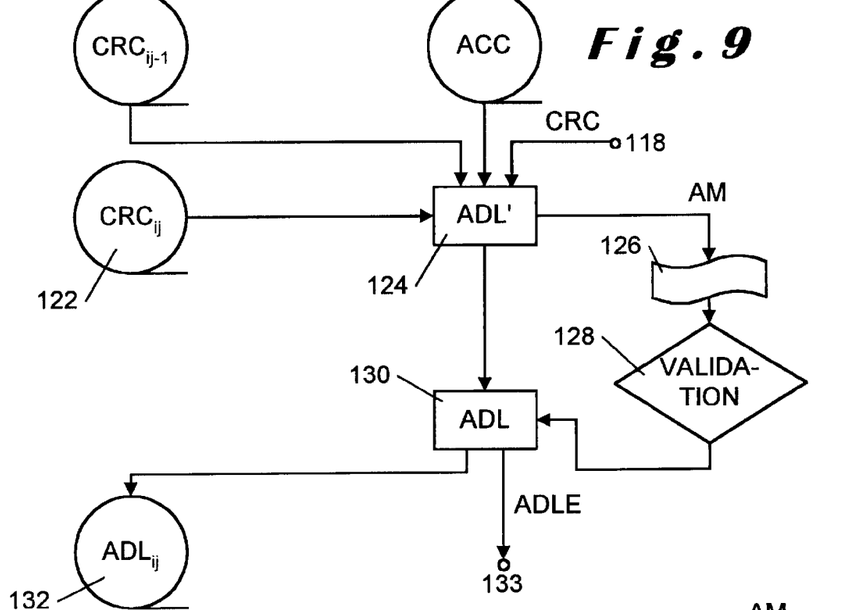
FIG. 9 is a flow chart illustrating the data processing procedure relating to the Allotment due to Liabilities according to the invention.

In FIG. 9, the Allotment due to Liabilities (ADL) procedure comprises readjustment of the cloned portfolios of Cloned Entities in accordance with the new Consolidation Ratios $CRC_{ij}$ in such a way that the portfolios of each Cloned Entity are always equivalent on a relative basis.

The ADL processing (block 124) is based on the data from the former consolidation of the accounts of the Cloned Portfolios (updated on the date of the previous Preparatory Valuation) at block 210 and on the difference between the data representing the most recent $CRC_{ij}$ of the Cloned Entity and the data representing the preceding $CRC_{j-1}$. This procedure is performed in three stages: allotment proposal (block 126), validation by the Consolidated Manager (block 128) and actual processing (block 130).

Readjustment of the Cloned Portfolios is performed at 132 via the generation of readjustment transactions between the preceding $CRC_{ij-1}$, and the one which has just been calculated.

Such readjustment transactions are generated with regard to all the Cloned Entities, for all the consolidated accounts which have been parameterized for this purpose in the general accounting plan. This is achieved by means of a preliminary operation effected when a Cloned Entity is initiated. Such parameters may subsequently be modified throughout the life of the Cloned Entity.

In particular, securities accounts are allotted via the generation of entire purchase or sales management transactions (with the Depositary Bank acting as an intermediary in the transaction), so as to specify the possible transformation of a greater or lesser potential value into a greater or lesser actual value during readjustment of the various Cloned Entities. Such internal transactions are conducted at the market price on the date on which the preceding Preparatory Valuations were calculated, the Consolidation Ratio applying to the number of securities.

Let us take the example of two Cloned Entities, each with a Consolidation Ratio of 50% within a Consolidation Statement. If the new Ratios stand at 60% for Entity 1 and 40% for Entity 2, the allotment due to liabilities of N securities of a consolidated portfolio item has the following result:

purchase of a security by Entity 1: (60%–50%)*N sale of a security by Entity 2: (40%–50%)*N.

The other items are allotted via direct application of the consolidation ratio, by generating a single readjustment with regard to previous balances, the consolidation ratio being applied to the amount.

Assuming the same initial data, the allotment due to liabilities of 100 $ of the consolidated cash assets item denominated in US$ generates:

an adjustment entry of +10 $ for Entity 1, an adjustment entry of –10 $ for Entity 2.

At the start of ADL processing, the Consolidation Statement status is set at ADLS in order to indicate that the processing has just started. This status then immediately changes to ADLC in order to indicate that the processing is under way; this dual management of status makes it possible for automatic restart to be performed correctly in the event of a problem occurring. The status finally changes to ADLE to indicate the end of processing. The signal indicating the latter status at point 133 makes it possible to initiate the following processing procedure (FIG. 10) which is an intermediate stage in the procedure of calculation of the net asset value (NCA). This stage is made necessary by a special feature of the invention.

Figure 10:
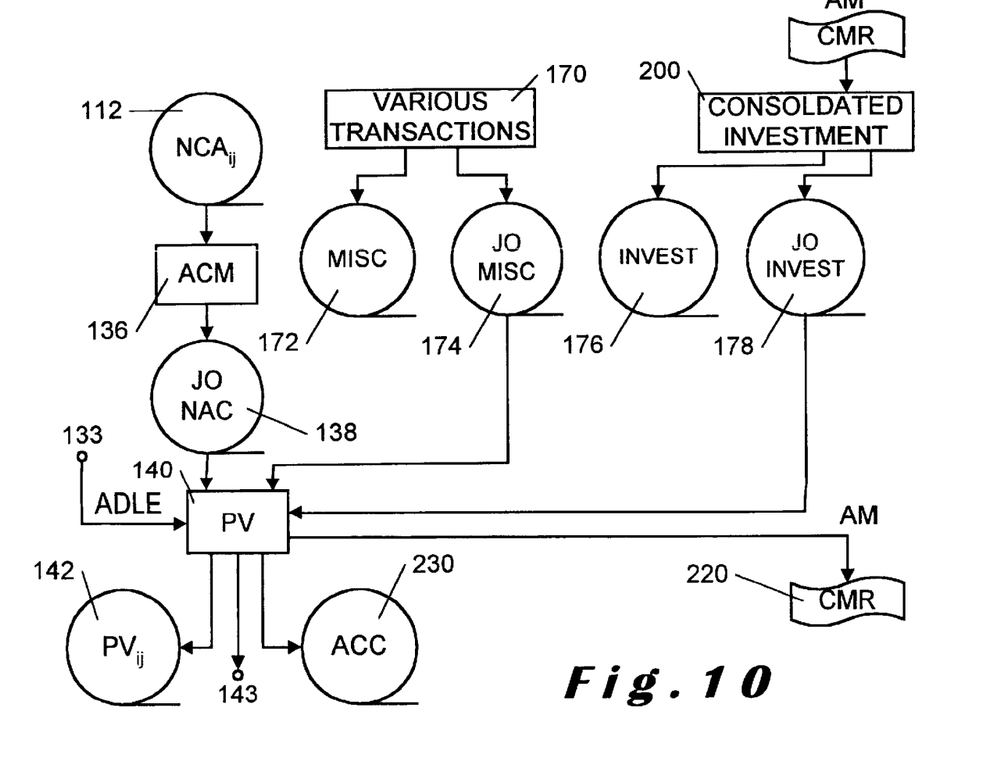
FIG. 10 is a flow chart illustrating the data processing procedure for carrying out the Preparatory Valuation according to the invention.

The illustrated procedure comprises the calculation of data representing the preparatory valuation of the Consolidation Statement. Processing is initiated in response to the ADLE signal which is generated by module CSA 30 and takes into account the Preparation transactions transcribed into a preparation log (block 138), miscellaneous transactions (block 174) and investment transactions recorded in an investments log (block 178) and initiated by the Manager (AM) of the consolidated set. The processing at block 140 generates a preparatory valuation transaction at 142, updates a provisional log of the Entities at 145 and provides a consolidated management report CMR at 220. Block 136 represents an accounting motor module which is initiated automatically at the start of processing of the preparatory valuation. As soon as the preparatory valuation has been performed, module CSA 30 generates a signal PVE at 143 which automatically initiates the Allotment due to Assets procedure ADA.

The start of the ADA procedure sets the Consolidation Statement status at ADAS (FIG. 6) in order to indicate that the Allotment due to Assets is under way. This procedure comprises the allotment to each Cloned Entity, in accordance with the Consolidation Ratio, of all the operations performed by the Asset Manager of the consolidated set on the assets included in the Consolidation Statement for which he/she has responsibility.

Figure 11:
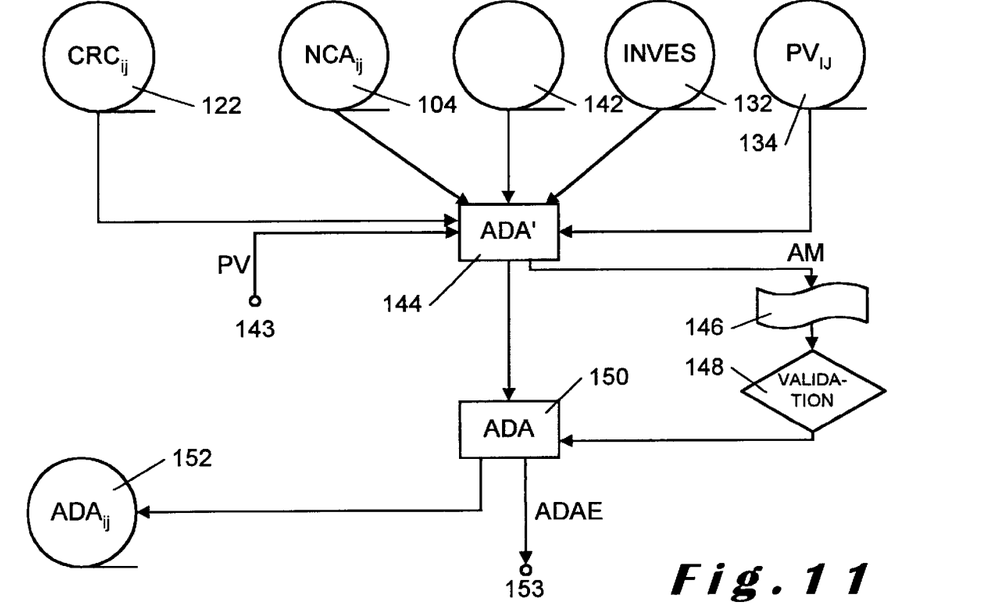
FIG. 11 is a flow chart illustrating the data processing procedure relating to the Allotment due to Assets according to the invention.

Specific ADA processing is shown in particular in FIG. 11. This procedure, like the Allotment due to Liabilities procedure described above, is performed in three stages: preparation for ADA allotment at 144, validation by the Global Asset Manager at 148 and actual processing at 150. The allotment is based on the day's operations recorded in the Consolidation Statement (Preparation operations at 104, Preparatory Valuation operation at 134, miscellaneous operations at 142 and investment transactions at 132) and on the day's $CRC_{ij}$ Ratios for the Entities. An allotment proposal, made in proportion to the net assets and/or in accordance with all other predetermined objective criteria, is submitted to the Manager of the consolidated set (AM) who validates it or, depending on the circumstances, modifies it, the validated proposal finally being allotted between the various Entities. This procedure generates transaction orders ADA at 152 in such a way that the portfolios of all the Cloned Entities are always equivalent on a relative basis.

For example, allotment of the sale of 10 new securities by the Global Asset Manager of two Entities having Consolidation Ratios of 60% and 40% respectively generates:

a purchase equivalent to 6 securities to Entity 1: 60%*10, a purchase equivalent to 4 securities to Entity 2: 40%*10.

A sequence of transactions has been implemented during the preceding processing stages. It is then necessary to generate the corresponding accounting transcriptions at the level of each of the Cloned Entities. That is what is performed by this processing in the following stage shown in FIG. 12.

Figure 12:
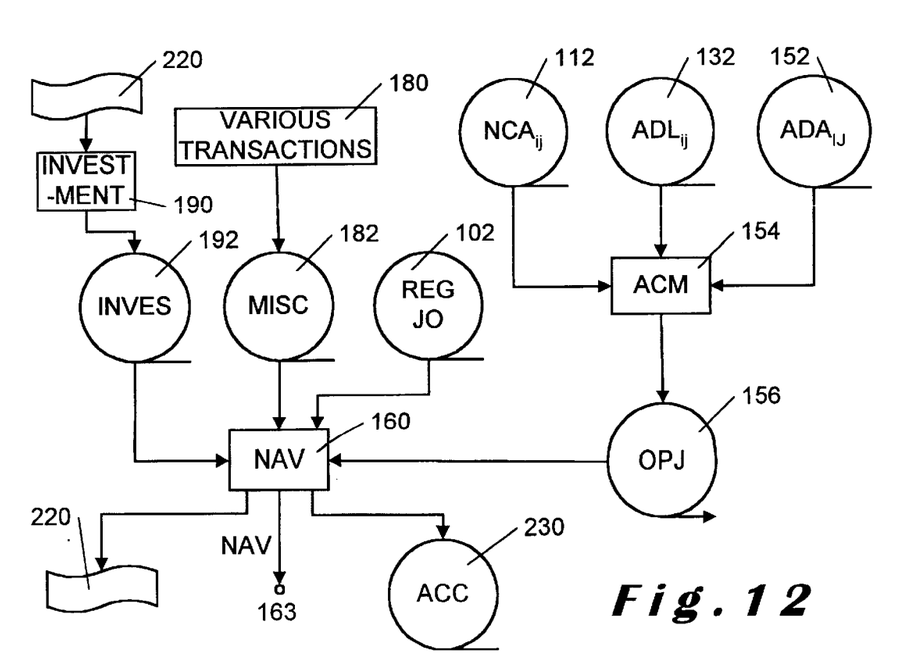
FIG. 12 is a flow chart illustrating the data processing procedure designed to permit determination of the Net Asset Value of an Entity according to the invention.

The various transactions performed by the procedures according to the invention update the provisional Journal of cloned operations (OPJ) at 156 via an independent and dynamic accounting motor (ACM) represented at 154. The data of the Journal at 156 is used for calculation, in a manner known per se, of the net asset value (NAV) at 160. A report of the net asset value of the Cloned Entity is edited at 220 for transmission to the Manager of the Entity in question. The net asset value data is transmitted and stored in the accounting database at 230.

To summarize, the processing system according to the invention makes it possible to produce seven statements:

1. A Preparation statement indicating the amount of cash assets supplied to or withdrawn from the Asset Manager of the consolidated set;

2. A Consolidation Ratios statement indicating the relative proportion of each Cloned Entity within their Consolidation Statement(s);

3. A Liabilities Allotment statement for the use of the Global Asset Manager of the consolidated set;

4. A consolidated management report which is based on the statement supplied during Preparatory Valuation for the Consolidation Statement and which is for the use of the Global Asset Manager of the consolidated set;

5. An Asset Allotment statement for the use of the Global Asset Manager of the consolidated set;

6. A specific management report which is based on the statement supplied during calculation of the Net Asset Value of the Cloned Entity and which is for the use of the possible manager of the Specific Portfolio;

7. A report indicating the Net Asset Value of the Cloned Entity for the use of the manager of the Cloned Entity.

In the foregoing there has been described the procedure for processing data from one cloned entity. One interesting aspect of the procedure according to the invention is that it makes it possible to process data from more than one Cloned Entity in a global and automatic fashion and to globalize such data within a number of consolidated sets (Consolidation Statements), which means that this procedure is extremely flexible.

It should be emphasized that the processing procedure according to the invention permits the global processing of as many internal Portfolios within a Cloned Entity as is desired, which means that a wide range of globalization options are offered, under which each Cloned Entity remains wholly and absolutely independent of the others. A Cloned Entity may also, according to the invention, retain a proportion of its assets which are not globalized but which are held in a Specific Portfolio. Such advantages cannot be offered by any of the known methods of globalization.

Thanks to the data processing system according to the invention, the consolidated management report which is drawn up automatically on a daily basis enables the Global Asset Manager to take global management decisions which the system immediately and automatically allots between the various Internal Cloned Portfolios or between the various Cloned Entities.

Figure 13:
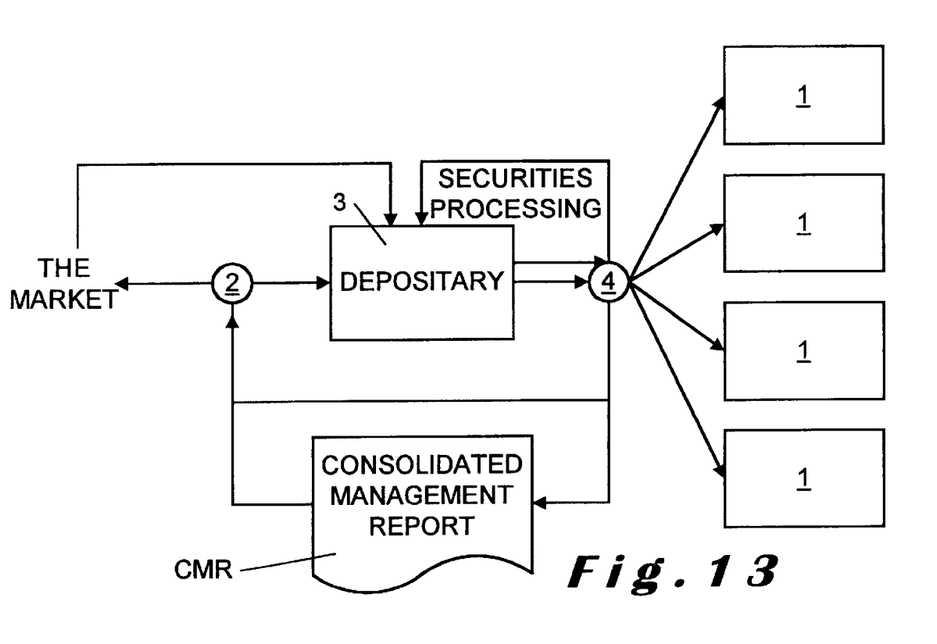
FIG. 13 is a diagram of data flows occurring during the Internal Portfolio readjustment procedure according to the invention.

On the one hand, the Asset Allotment system, which processes the Global Asset Manager's decisions, generates data flows which are shown in the diagram of FIG. 13.

The investment decisions taken by the Global Asset Manager (AM) 2 on the basis of the consolidated management report (CMR) are passed on to the Depositary 3 which receives market confirmation of them. Each decision is then inserted in the allotment system (ADA) and processed as described above. The Global Asset Manager receives an allotment proposal made by the system in proportion to the net assets and/or any other predetermined criteria and, after validation by the Global Manager or the application of any kind of modification by the latter, it is automatically allotted between the various Cloned Entities 1.

Figure 14:
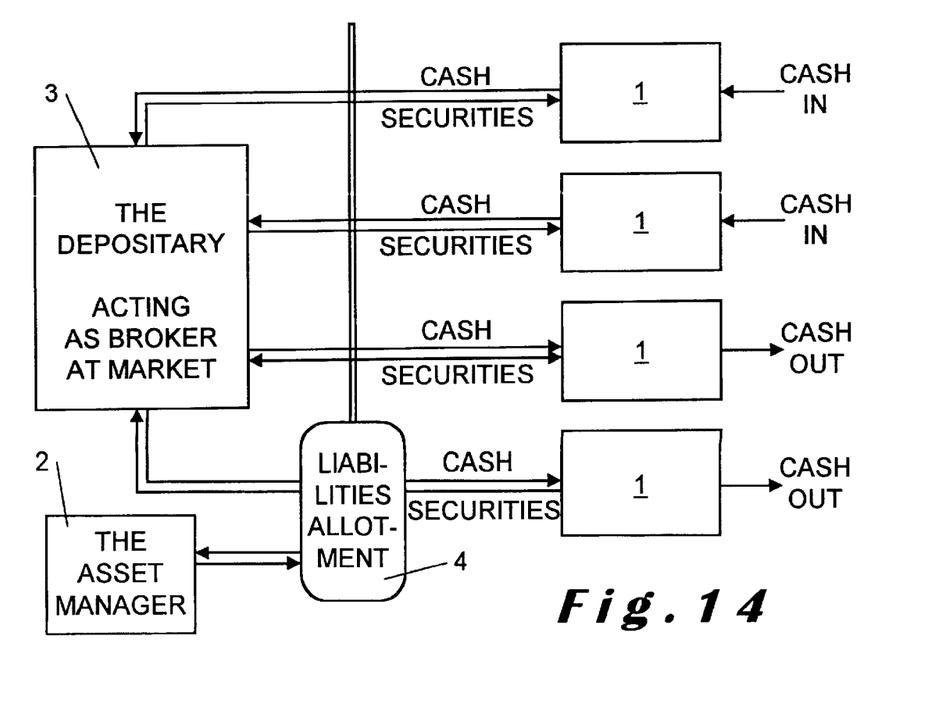
FIG. 14 is a diagram of the data flows occurring during the Asset Allotment procedure according to the invention.

On the other hand, the Liabilities Allotment system relates to the transactions of cash assets applied to or performed by each of the Cloned Entities 1 and generates data flows shown in the diagram in FIG. 14. As described above, this processing system. (ADL) restores the balance between the Cloned Entities 1 by generating a sequence of orders to purchase securities emanating from those Entities having a surplus of cash assets with the Depositary 3 and a sequence of orders to sell the said securities emanating by those Cloned Entities which have insufficient cash assets. This means that any event affecting the liabilities is automatically processed by the system according to the invention in such a way that the relative value between separate Internal Portfolios or Internal Portfolios belonging to separate Entities is always maintained.

The mode of implementation described above by way of example is intended as an illustration only, and the invention is in no way limited to this example. Any modification, variation or equivalent arrangement must be considered to be included under the invention.

We claim:

1. A method for distributing securities of portfolio items among a plurality of internal portfolios, each portfolio item comprising a determined number of securities distributed over each internal portfolio according to a determined consolidation ratio ($CRC_{i,j-1}$) attributed to each internal portfolio, the method comprising the steps of:

determining a total value ($PV_{j-1}$) of said portfolio items;

receiving a transaction assigned to one portfolio item within one internal portfolio, said transaction having a transaction value ($NCA_i$);

determining, responsive to said transaction, a further consolidation ratio ($CRC_{i,j}$) for each internal portfolio based on the consolidation ratio ($CRC_{i,j-1}$), said total cash assets ($PV_{j-1}$) and said transaction value ($NCA_i$);

transferring, for each portfolio item, from each of said plurality of internal portfolios to said one internal portfolio to which said transaction is assigned a number M of securities, M being equal to: $M=N\times[CRC_{i,j}-CRC_{i,j-1}]$ where N is the number of securities of said portfolio item; and allotting, to each of said internal portfolios, said transaction according to said further consolidation ratio ($CRC_{i,j}$).

2. The method of claim 1, further comprising the steps of:

receiving a further transaction assigned to one of said portfolio items; and allotting, to each of said internal portfolios, said further transaction to each of said internal portfolios according to said further consolidation ratio ($CRC_{i,j}$).

3. The method of claim 1, wherein said further consolidation ratio ($CRC_{i,j}$) is equal to:

$$CRC_{i,j} = \frac{PV_{j-1} * CRC_{i,j-1} + NCA_i}{PV_{j-1} + \sum_{i=1}^{Q} NCA_i}$$

where:

$PV_{j-1}$ is the total cash assets at time j-1;

$CRC_{i,j-1}$ is the consolidation ratio of the internal portfolio i at time j-1;

$NCA_i$ is the transaction value assigned to one portfolio item within one internal portfolio i; and Q is the number of internal portfolios.

4. A system for distributing securities of portfolio items among a plurality of internal portfolios, each portfolio item comprising a determined number of securities distributed over each internal portfolio according to a determined consolidation ratio ($CRC_{i,j-1}$) attributed to each internal portfolio, the system comprising:

means for determining a total value ($PV_{j-1}$) of said portfolio items;

means for receiving a transaction assigned to one portfolio item within one internal portfolio, said transaction having a transaction value ($NCA_i$);

means for determining, responsive to said transaction, a further consolidation ratio ($CRC_{i,j}$) for each internal portfolio based on the consolidation ratio ($CRC_{i,j-1}$), said total cash assets ($PV_{j-1}$) and said transaction value ($NCA_i$);

means for transferring, for each portfolio item, from each of said plurality of internal portfolios to said one internal portfolio to which said transaction is assigned a number M of securities, M being equal to: $M=N\times[CRC_{i,j}-CRC_{i,j}-]$ where N is the number of securities of said portfolio item; and means for allotting, to each of said internal portfolios, said transaction according to said further consolidation ratio ($CRC_{i,j}$).

5. The system of claim 4, further comprising:

means for receiving a further transaction assigned to one of said portfolio items; and means for allotting, to each of said internal portfolios, said further transaction to each of said internal portfolios according to said further consolidation ratio ($CRC_{i,j}$).

* * * * *